United States Patent
Tsau et al.

(10) Patent No.: US 12,200,589 B2
(45) Date of Patent: *Jan. 14, 2025

(54) METHOD AND SYSTEM FOR SEGMENTING AND TRANSMITTING DATA BETWEEN COMPUTING DEVICES AND VEHICLE HEAD UNITS

(71) Applicant: Google LLC, Mountain View, CA (US)

(72) Inventors: Jennifer Yee Tsau, Mountain View, CA (US); Ramasadagopan Periathiruvadi, Sunnyvale, CA (US); Anthony Jesse Chen, San Francisco, CA (US); Daniel Harms, Mountain View, CA (US); Yuxing Yao, Santa Clara, CA (US); Wenting Zhai, Mountain View, CA (US); Yiran Yan, Sunnyvale, CA (US); Thomas Anthony Pelaia, II, Knoxville, TN (US)

(73) Assignee: Google LLC, Mountain View, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/930,852

(22) Filed: Sep. 9, 2022

(65) Prior Publication Data
US 2023/0007460 A1 Jan. 5, 2023

Related U.S. Application Data

(63) Continuation of application No. 17/130,755, filed on Dec. 22, 2020, now Pat. No. 11,477,626.

(51) Int. Cl.
*H04W 4/80* (2018.01)
*H04L 69/324* (2022.01)
*H04W 76/14* (2018.01)

(52) U.S. Cl.
CPC ............. *H04W 4/80* (2018.02); *H04L 69/324* (2013.01); *H04W 76/14* (2018.02)

(58) Field of Classification Search
CPC ........ H04W 4/80; H04W 76/14; H04L 69/324
See application file for complete search history.

(56) References Cited

U.S. PATENT DOCUMENTS

| | | |
|---|---|---|
| 7,610,057 B2 | 10/2009 | Bahl et al. |
| 8,255,537 B2 | 8/2012 | Hamada et al. |

(Continued)

FOREIGN PATENT DOCUMENTS

| | | |
|---|---|---|
| CN | 101611434 A | 12/2009 |
| CN | 103797720 A | 5/2014 |

(Continued)

OTHER PUBLICATIONS

Extended Search Report from counterpart European Application No. 21198003.2 dated Jan. 31, 2022, 9 pp.

(Continued)

*Primary Examiner* — David Bilodeau
(74) *Attorney, Agent, or Firm* — Shumaker & Sieffert, P.A.

(57) ABSTRACT

An example method includes receiving, by a first application executing on a primary device and from a second application executing on the primary device, an indication of data to be transferred, wherein the primary device and the vehicle head unit are communicatively coupled via a wireless network connection operating in accordance with a wireless networking protocol; determining, by the first application and based on the indication of the data, an amount of data to be transferred; determining, by the first application, whether the amount of data satisfies a maximum packet size for the wireless networking protocol; responsive to determining that the amount of data does not satisfy the maximum packet (Continued)

size: segmenting the data into a plurality of packets, wherein each packet from the plurality of packets includes an amount of data that satisfies the maximum packet size; and sending the plurality of packets using the wireless network connection.

18 Claims, 6 Drawing Sheets

(56) References Cited

U.S. PATENT DOCUMENTS

| | | |
|---|---|---|
| 8,798,003 B2 | 8/2014 | Arakawa |
| 8,831,585 B2 | 9/2014 | Nicholson et al. |
| 9,144,094 B2 | 9/2015 | Bhamidipati et al. |
| 9,462,626 B1 | 10/2016 | Thanayankizil et al. |
| 9,509,517 B2 | 11/2016 | Kojima et al. |
| 9,534,909 B2 | 1/2017 | Rhee et al. |
| 9,571,284 B2 | 2/2017 | Leboeuf et al. |
| 9,584,601 B2 | 2/2017 | Asaduzzaman et al. |
| 9,925,936 B2 | 3/2018 | Rai |
| 10,567,479 B2 | 2/2020 | Tal et al. |
| 11,511,625 B2 | 11/2022 | Oh |
| 2005/0049021 A1 | 3/2005 | Nedelcu et al. |
| 2005/0239497 A1 | 10/2005 | Bahl et al. |
| 2008/0080458 A1 | 4/2008 | Cole |
| 2011/0228749 A1 | 9/2011 | Taghavi Nasrabadi et al. |
| 2013/0106750 A1 | 5/2013 | Kurosawa |
| 2014/0120829 A1 | 5/2014 | Bhamidipati et al. |
| 2015/0319001 A1 | 11/2015 | Kojima et al. |
| 2016/0234870 A1 | 8/2016 | Borges et al. |
| 2016/0270144 A1 | 9/2016 | Thanayankizil et al. |
| 2017/0041304 A1 | 2/2017 | Tal et al. |
| 2017/0041381 A1 | 2/2017 | Tal et al. |
| 2017/0366596 A1 | 12/2017 | Han et al. |
| 2019/0068718 A1 | 2/2019 | Lee |
| 2019/0387382 A1 | 12/2019 | Wojcieszak et al. |
| 2020/0100091 A1 | 3/2020 | Lee et al. |
| 2020/0162205 A1 | 5/2020 | Han et al. |
| 2020/0164747 A1 | 5/2020 | Oh |
| 2021/0141073 A1 | 5/2021 | Okazaki |
| 2021/0243274 A1 | 8/2021 | Thomas |
| 2021/0306909 A1 | 9/2021 | Hosseini et al. |
| 2022/0201449 A1 | 6/2022 | Tsau et al. |

FOREIGN PATENT DOCUMENTS

| | | | |
|---|---|---|---|
| CN | 104798399 A | 7/2015 | |
| CN | 105978927 A | 9/2016 | |
| CN | 107925654 A | 4/2018 | |
| CN | 109819493 A | 5/2019 | |
| CN | 111212407 A | 5/2020 | |
| DE | 102018206785 A1 * | 11/2019 | ............ H04L 67/12 |
| JP | 2002044005 A | 2/2002 | |
| JP | 2005102122 A | 4/2005 | |
| JP | 2005328520 A | 11/2005 | |
| JP | 2007521682 A | 8/2007 | |
| JP | 2010505347 A | 2/2010 | |
| JP | 2012503449 A | 2/2012 | |
| JP | 2012120089 A | 6/2012 | |
| JP | 2013511901 A | 4/2013 | |
| JP | 2013236346 A | 11/2013 | |
| JP | 2014103580 A | 6/2014 | |
| JP | 2014532321 A | 12/2014 | |
| JP | 2016012918 A | 1/2016 | |
| JP | 2016503601 A | 2/2016 | |
| KR | 20150079820 A | 7/2015 | |
| KR | 20170105545 A | 9/2017 | |
| KR | 20190021054 A | 3/2019 | |
| WO | 2010033919 A2 | 3/2010 | |
| WO | 2012081622 A | 6/2012 | |
| WO | 2013039760 A1 | 3/2013 | |
| WO | 2013039763 A1 | 3/2013 | |
| WO | 2019211024 A1 | 11/2019 | |

OTHER PUBLICATIONS

First Examination Report from counterpart Indian Application No. 202144042708 dated Jul. 7, 2022, 15 pp.
Prosecution History from U.S. Appl. No. 17/130,755, dated Mar. 30, 2022 through Aug. 19, 2022, 34 pp.
Response to Office Action dated Sep. 29, 2022 from counterpart Indian Application No. 202144042708 filed Sep. 21, 2022, , 15 pp.
Office Action from counterpart Japanese Application No. 2021-166214 dated Dec. 20, 2022, 9 pp.
Response to Extended Search Report dated Jan. 31, 2023, from counterpart European Application No. 21198003.2 filed Dec. 1, 2022, 24 pp.
Decision of Rejection, and translation thereof, from counterpart Japanese Application No. 2021-166214 dated Aug. 22, 2023, 9 pp.
Office Action, and translation thereof, from counterpart Korean Application No. 10-2021-0135911 dated Feb. 24, 2024, 14 pp.
First Office Action and Search Report, and translation thereof, from counterpart Chinese Application No. 202111151892.1 dated Mar. 21, 2024, 20 pp.
Communication pursuant to Article 94(3) EPC from counterpart European Application No. 21198003.2 dated Jul. 5, 2024, 8 pp.
Notice of Intent to Grant from counterpart Japanese Application No. 2021-166214 dated Jun. 25, 2024, 3 pp.
Office Action, and translation thereof, from counterpart Chinese Application No. 202111151892.1 dated Sep. 19, 2024, 21 pp.
Response to Communication pursuant to Article 94(3) EPC dated Jul. 5, 2024, from counterpart European Application No. 21198003.2 filed Oct. 11, 2024, 18 pp.
Notice of Intent to Grant from counterpart Korean Application No. 10-2021-0135911 dated Oct. 30, 2024, 5 pp.
Response to Second Office Action, and machine translation thereof, dated Sep. 19, 2024, from counterpart Chinese Application No. 202111151892.1 filed Nov. 19, 2024, 12 pp.

* cited by examiner

METHOD AND SYSTEM FOR SEGMENTING AND TRANSMITTING DATA BETWEEN COMPUTING DEVICES AND VEHICLE HEAD UNITS

RELATED APPLICATION

This application is a continuation of U.S. application Ser. No. 17/130,755, filed Dec. 22, 2020, the entire contents of which are hereby incorporated by reference.

BACKGROUND

A vehicle may include a so-called "head unit" or other integrated head unit that presents an interface (e.g., a graphical user interface—GUI) by which to control the vehicle systems, such as a heating, ventilation, and air conditioning (HVAC) system, a lighting system (for controlling interior and/or exterior lights), an infotainment system, a seating system (for controlling a position of a driver and/or passenger seat), etc. The interface may be presented via a console (e.g., an in-vehicle display). A user of a vehicle, such as an automobile, motorcycle, a bus, a recreational vehicle (RV), a semi-trailer truck, a tractor or other type of farm equipment, a train, a plane, a drone, a helicopter, a personal transport link vehicle, or the like, may connect a primary device (e.g., mobile phone) to the vehicle's head unit to project (or, in other words, serve) a graphical user interface to the head unit. The head unit may then present the graphical user interface via a display coupled to the head unit.

In many cases, a primary device may receive data for one or more applications of the primary device and may transmit the data to a vehicle head unit. For example, a vehicle operator may receive one or more messages while traveling in vehicles and may want to display the messages on a display of the vehicle head unit. In some examples, the primary device may transmit data to a proprietary cloud, and the proprietary cloud may transmit the data to the head unit. However, such implementation requires the data to be converted into a proprietary format, which may render the data difficult to use once removed from the proprietary cloud.

SUMMARY

In general, techniques of this disclosure are directed to providing a companion application for establishing a peer to peer communication channel to send arbitrary data between a primary device and a head unit. According to the disclosed techniques, the companion application may process and transmit data between the primary device and the head unit in data segments via a wireless network connection operating in accordance with a wireless networking protocol, such as Bluetooth® communication protocol or Bluetooth® Low Energy communication protocol. The companion application may receive an indication of data to be transferred between the primary device and the vehicle head unit and determine an amount of data to be transferred based on the indication of the data. The companion application may further determine whether the amount of data satisfies a maximum packet size for the wireless networking protocol. Responsive to determining that the amount of data does not satisfy the maximum packet size, the companion application may segment the data into a plurality of packets and transmit the data in the plurality of packets using the wireless network connection.

In this respect, various aspects of the techniques may provide a peer to peer communication channel that enables a primary device and a head unit to transmit data directly with each other, thereby eliminating the need for a central server. The peer to peer communication channel provides a decentralized environment that minimizes single point of failure and thereby potentially promote vehicle network communication. Furthermore, by segmenting data into data segments and transmitting data in a plurality of packets, the disclosed techniques enhance the overall reliability and fault-tolerance of data communication. By restart transmitting only undelivered packets, various aspects of the techniques may enable the primary device and the head unit to operate more efficiently (e.g., in terms of processor cycles expended, memory consumed, memory bus bandwidth utilized, wireless bandwidth consumed, etc.) as restart transmitting the entire data requires additional resources (e.g., processor cycles, memory space, memory bus bandwidth, wireless bandwidth, etc.).

In some examples, a method includes receiving, by a first application executing on a primary device and from a second application executing on the primary device, an indication of data to be transferred between the primary device and a vehicle head unit, wherein the primary device and the vehicle head unit are communicatively coupled via a wireless network connection operating in accordance with a wireless networking protocol; determining, by the first application and based on the indication of the data, an amount of data to be transferred from the primary device to the vehicle head unit; determining, by the first application, whether the amount of data satisfies a maximum packet size for the wireless networking protocol; responsive to determining that the amount of data does not satisfy the maximum packet size: segmenting, by the first application, the data into a plurality of packets, wherein each packet from the plurality of packets includes an amount of data that satisfies the maximum packet size; and sending, from the primary device and to the vehicle head unit, the plurality of packets using the wireless network connection; and responsive to determining that the amount of data satisfies the maximum packet size, sending, from the primary device and to the vehicle head unit, a single packet using the wireless network connection, wherein the single packet includes the data.

In some examples, a method includes receiving, by a first application executing on a vehicle head unit, from a primary device, and using a wireless network connection, a plurality of packets, wherein the packets are configured in accordance with a wireless networking protocol, wherein each of the packets include a portion of data provided by a first application executing on the primary device, wherein the data is segmented into the plurality of packets by a second application executing on the primary device, and wherein the data has a size that is larger than a maximum packet size for the wireless networking protocol; combining, by the first application executing on the vehicle head unit, the portions of data included in each of the packets into the data; and providing, by the first application executing on the vehicle head unit and to a second application executing on the vehicle head unit, the data, wherein the first and second applications executing on the vehicle head unit are different from an operating system executing on the vehicle head unit, and wherein the first and second applications executing on the primary device are different from an operating system executing on the primary device.

In some examples, a primary device includes: a memory configured to store an operating system, a first application, and a second application; and one or more processors configured to: receive, by the first application executing on the primary device and from the second application executing on the primary device, an indication of data to be transferred between the primary device and a vehicle head unit, wherein the primary device and the vehicle head unit are communicatively coupled via a wireless network connection operating in accordance with a wireless networking protocol; determine, by the first application and based on the indication of the data, an amount of data to be transferred from the primary device to the vehicle head unit; determine, by the first application, whether the amount of data satisfies a maximum packet size for the wireless networking protocol; responsive to determining that the amount of data does not satisfy the maximum packet size: segment, by the first application, the data into a plurality of packets, wherein each packet from the plurality of packets includes an amount of data that satisfies the maximum packet size; and send, from the primary device and to the vehicle head unit, the plurality of packets using the wireless network connection; and responsive to determining that the amount of data satisfies the maximum packet size, send, from the primary device and to the vehicle head unit, a single packet using the wireless network connection, wherein the single packet includes the data.

In some examples, a vehicle head unit includes: a memory configured to store an operating system, a first application, and a second application; and one or more processors configured to: receive, by the first application executing on the vehicle head unit, from a primary device, and via a wireless network connection, a plurality of packets, wherein the packets are configured in accordance with a wireless networking protocol, wherein each of the packets include a portion of data provided by a first application executing on the primary device, wherein the data is segmented into the plurality of packets by a second application executing on the primary device, and wherein the data has a size that is larger than a maximum packet size for the wireless networking protocol; combine, by the first application executing on the vehicle head unit, the portions of data included in each of the packets into the data; and provide, by the first application executing on the vehicle head unit and to a second application executing on the vehicle head unit, the data, wherein the first and second applications executing on the vehicle head unit are different from an operating system executing on the vehicle head unit, and wherein the first and second applications executing on the primary device are different from an operating system executing on the primary device.

The details of one or more examples are set forth in the accompanying drawings and the description below. Other features, objects, and advantages of the disclosure will be apparent from the description and drawings, and from the claims.

DETAILED DESCRIPTION

Figure 1:
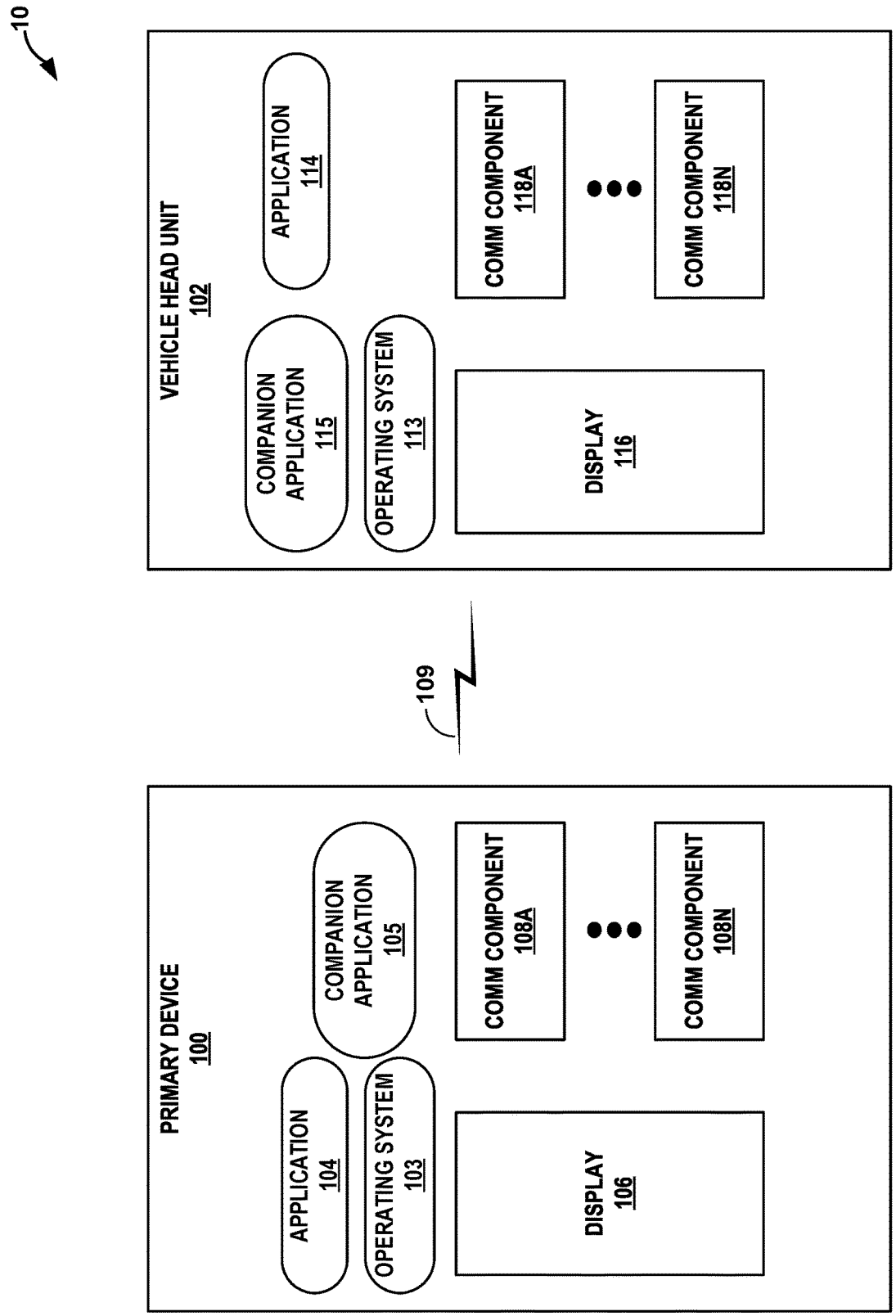
FIG. 1 is a conceptual diagram illustrating an example system that is configured to perform various aspects of the peer to peer communication techniques described in this disclosure.

FIG. 1 is a conceptual diagram illustrating an example system that is configured to perform various aspects of the communication transport techniques described in this disclosure. As shown in the example of FIG. 1, a system 10 may manage a plurality of transports in accordance with one or more techniques of this disclosure. System 10 may include a primary device 100 and a vehicle head unit 102.

In the example of FIG. 1, primary device 100 is a smartphone. However, other examples of primary device 100 may be a cellular phone, a smartphone, a head unit expansion or upgrade cartridge module, a personal digital assistant (PDA), a laptop computer, a tablet computer, a portable gaming device, a portable media player, an e-book reader, a watch (including a so-called smartwatch), an add-on device (such as a casting device), smart glasses, a gaming controller, a vehicle, or another type of portable or mobile device.

Vehicle head unit 102 may represent an integrated head unit that presents an interface (e.g., a graphical user interface—GUI) by which to control the vehicle systems, such as a heating, ventilation, and air conditioning (HVAC) system, a lighting system (for controlling interior and/or exterior lights), an infotainment system, a seating system (for controlling a position of a driver and/or passenger seat), etc. The interface may be presented via a console (e.g., an in-vehicle display, which is shown as display 116 in the example of FIG. 1). Vehicle head unit 102 may be included in a motorcycle, a bus, a recreational vehicle (RV), a semi-trailer truck, a tractor or other type of farm equipment, a train, a plane, a drone, a helicopter, a personal transport vehicle, or any other type of vehicle capable of managing transports in accordance with one or more of the techniques described herein.

Primary device 100 may, as shown in the example of FIG. 1, include operating system 103 that provides an execution environment for one or more applications, such as application 104. Operating system 103 may represent a multi-threaded operating system or a single-threaded operating system with which application 104 may interface to access hardware of primary device 100. Operating system 103 may include a kernel that facilitates access to the underlying hardware of primary device 100, where kernel may present a number of different interfaces (e.g., application programmer interfaces—APIs) that application 104 may invoke to access the underlying hardware of primary device 100.

Examples of the underlying hardware of primary device 100 include one or more processors (which are not shown for ease of illustration) that support execution of operating system ("OS") 103 and application 104, display 106, and communication ("COMM") components 108A-108N ("comm components 108," which may also be referred to as "communication components 108"). Display 106 of primary device 100 may represent a presence-sensitive display that functions as an input device and as an output device. Presence-sensitive display 106 may be implemented using various display hardware.

For instance, presence-sensitive display 106 may function as an input device using a presence-sensitive input component, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive display technology. Presence-sensitive display 106 may function as an output (e.g., display) device using any one or more display components, such as a liquid crystal display (LCD), dot matrix display, light-emitting diode (LED) display, organic light-emitting diode (OLED) display, e-ink, or similar monochrome or color display capable of outputting visible information to a user of primary device 100.

Communication components 108 may include wireless communication devices capable of transmitting and/or receiving communication signals such as a cellular radio, a 3G radio, a 4G radio, a 5G radio, a Bluetooth® radio (or any other personal area network (PAN) radio), an Near-filed communication (NFC) radio, or a Wi-Fi™ radio (or any other wireless local area network (WLAN) radio). Additionally or alternatively, communication components 108 may include wired communication devices capable of transmitting and/or receiving communication signals via a direct link over a wired communication medium (e.g., a universal serial bus—USB—cable).

Operating system 103 and/or application 104 may present a graphical user interface (GUI) with which a user of primary device 100 may interface to interact with primary device 100. Operating system 103 may present, via display 106, a GUI that includes one or more icons or other visual representations of application 104, where the user of primary device 100 may select one or more of the icons or other visual representations to access various services provided by primary device 100 either by way of operating system 103 or by way of application 104.

For example, operating system 103 may include various integrated applications (where application 104 may represent one or more of these integrated applications) that allow for telephone services (e.g., cellular telephony services, Voice over Internet Protocol—VoIP—services, etc.), web conferencing services, video conferencing services, texting services, email services, web browsing services (e.g., via an integrated web browser), navigation services, assistant services, application store services (by which to obtain third-party applications, where application 104 may represent either or both of integrated first-party applications and/or third-party applications obtained via the application store services), and/or any other service provided by way of integrated first-party applications.

Application 104 may represent, as noted above, a first-party application developed and provides as an application integrated into operating system 103 or a third-party application that the user of primary device 100 obtains via application store services provided by way of operating system 103. Application 104 may extend the software functionality of primary device 100, where application 104 may execute within an execution environment presented by operating system 103. Application 104 may, as a few examples, provide gaming services (e.g., video games), email services, web browsing services, texting and/or chat services, web conferencing services, video conferencing services, music services (including streaming music services), video services (including video streaming services), navigation services, word processing services, spreadsheet services, slide and/or presentation services, assistant services, text entry services, or any other service commonly provided by applications.

As also shown in the example of FIG. 1, vehicle head unit 102 may include operating system 113, which may be similar or substantially similar to operating system 103 in that operating system 113 may present an execution environment in which one or more applications (which are not shown in the example of FIG. 1 for ease of illustration purposes) may execute to extend the functionality of (or, in other words, services provided by) vehicle head unit 102. Operating system 113 may include integrated first-party applications that provide services similar to those discussed above with respect to the integrated applications of operating system 103. Moreover, the one or more third-party applications executing in the execution environment provided by operating system 113 may provide services similar to those discussed above with respect to application 104.

In any event, operating system 113 may present interfaces by which the applications may interface with the underlying hardware of vehicle head unit 102. The underlying hardware of vehicle head unit 102 may include one or more processors (which again are not shown in the example of FIG. 1 for ease of illustration purposes) that are configured to execute operating system 113 and the one or more applications, display 116 and communication ("COMM") components 118A-118N ("comm components 118," which may also be referred to as "communication components 118").

Display 116 may be similar to display 106, where display 116 may, similar to display 106, represent a presence-sensitive display (and as such may be referred to as "presence-sensitive display 116"). That is, similar to presence-sensitive display 106 of primary device 100, presence-sensitive display 116 may function as an input device (e.g., by using a presence-sensitive input component, such as a resistive touchscreen, a surface acoustic wave touchscreen, a capacitive touchscreen, a pressure-sensitive screen, an acoustic pulse recognition touchscreen, etc.) and as an output device (e.g., by using any one or more display components, such as a liquid crystal display (LCD), dot matrix display, light-emitting diode (LED) display, organic light-emitting diode (OLED) display, e-ink, etc.). Moreover, similar to communication components 108 of primary device 100, communication components 118 may include wireless and wired communication interfaces capable of transmitting and/or receiving communication signals such as a cellular radio, a 3G radio, a 4G radio, a 5G radio, a Bluetooth® radio (or any other type of PAN radio), a Wi-Fi™ radio (or any other type of WLAN radio), ethernet, USB, etc. For example, communication components 118 may include a Bluetooth® communication module and vehicle head unit 102 may receive a Bluetooth® pairing request from a Bluetooth® communication module of primary device 100 (e.g., communication component 108A of primary device 100), and pair one of communication components 118 of vehicle head unit 102 with the Bluetooth® communication module of primary device 100.

An occupant of the vehicle in which vehicle head unit 102 is located may connect primary device 100 (e.g., a smartphone) to vehicle head unit 102 to transmit data to vehicle head unit 102. Vehicle head unit 102 may then present the graphical user interface via display 116.

To transmit data to vehicle head unit 102, primary device 100 may connect to vehicle head unit 102 via a wired transport or a wireless transport provided via a communication session between communication components 108 and corresponding communication components 118. Wired transports may include a universal serial bus (USB) transport in which primary device 100 is coupled to vehicle head unit 102 via a USB cable. Wireless transports may include a personal area network (PAN) transport, which may include Bluetooth® communication, low energy and high (or, in other words, normal) energy versions, a wireless local area network (WLAN) connection, and the like.

Initially, the occupant may couple or, in other words, pair primary device 100 to vehicle head unit 102 via one of communication components 108 that support a PAN wireless transport, where this coupling may be referred to as pairing. For example, communication components 108 may include a Bluetooth® communication module and primary device 100 may receive a Bluetooth® pairing request from a Bluetooth® communication module of vehicle head unit 102 (e.g., communication component 118A of vehicle head unit 102), and pair one of communication components 108 of primary device 100 with the Bluetooth® communication module of vehicle head unit 102. Once paired, primary device 100 may, so long as the one of communication components 108 is enabled, automatically pair with vehicle head unit 102.

In this respect, operating system 113 may represent a thin client that operates to receive data to be processed by operating system 103 and/or application 104 of primary device 100. In some examples, operating system 113 may include a hardware abstraction layer (HAL) and a thin kernel (that acts as the client) by which to support projection of a GUI provided by primary device 100. The HAL may allow primary device 100 to provide commands by which to interface with various aspects (e.g., heating, ventilation, and air conditioning systems—HVAC systems, seat control systems, lighting systems, navigation hardware—such as global positioning systems, or any other aspects noted above with respect to the vehicle) of the vehicle in which vehicle head unit 102 is integrated.

A "thin" client or a "thin" kernel refers to a client or kernel that provides sufficient functionality to support projection but does not provide a full-featured operating system experience. Such thin client or kernel may, in other words, not support native execution of applications by operating system 113, but rather provide an operating environment over which to interface with primary device 100 to obtain the GUI projected by primary device 100. The thin client or kernel may also provide, to primary device 100, data regarding occupant interaction with vehicle head unit 102 (e.g., selection of a location on display 116) and/or changing control states of the various aspects of the vehicle in which vehicle head unit 102 is integrated, such as the states of various physical controls in the vehicle, including buttons or other controls associated with vehicle head unit 102, controls integrated into the steering wheel or other control interface, etc. The thin client or kernel may enable more efficient execution of operating system 113 across a wider variety of vehicle head units that may have large differences in terms of hardware.

In any event, operating system 103 may interface with one or more communication components 108 to establish a transport (which is shown as transport 109) between primary device 100 and vehicle head unit 102. In some instances, primary device 100 may include companion application 105 that indicates a particular transport of the number of different transports by which data from companion application 105 is to be communicated to vehicle head unit 102. In these instances, operating system 103 may present an interface (e.g., an application programming interface) by which companion application 105 may request operating system 103 to establish the particular transport. Companion application 105 may, in this instance, represent an application that facilitates the projection of the GUI to vehicle head unit 102 (and providing a bridge between approved additional applications 104—e.g., for music streaming, navigation, telephone, notifications, etc.—and projection of GUIs for these applications 104). It should be noted that applications 104 and companion application 105 executing on primary device 100 are different from operating system 103 executing on primary device 100.

Companion application 105 of primary device 100 may receive data to be transmitted from an additional application 104 of primary device 100 and may transmit the data to a companion application 115 of vehicle head unit 102 via requested transport 109. Companion application 115 of vehicle head unit 102 may then transmit the received data to an additional application 114 of vehicle head unit 102 for GUI projection via display 116 of vehicle head unit 102. It should be noted that application 114 and companion application 115 executing on vehicle head unit 102 are different from operating system 113 executing on vehicle head unit 102. Furthermore, when discussing projection of the GUI, it should be understood that companion application 105 passes the data to be projected (e.g., representative of the GUI) to operating system 103, which interfaces with one or more communication components 108 to output the data to be projected via transport 109 to vehicle head unit 102. Vehicle head unit 102 receives the data to be projected via transport 109 and a corresponding one of communication components 118 and interfaces with display 116 to present the GUI represented by the data received via transport 109.

Vehicle network communication is often based on a proprietary server. For example, to receive data produced in a vehicle, an application of a mobile device needs to connect to the proprietary server to access in-vehicle data. Using a proprietary server to transmit data between the mobile device and the vehicle requires the in-vehicle data to be converted into a proprietary format, which may render the data difficult to use once removed from the proprietary server. The techniques of this disclosure may improve vehicle network communication. Using companion application 105 of primary device 100 and companion application 115 of vehicle head unit 102 to transmit data may provide a peer to peer communication channel that enables primary device 100 and vehicle head unit 102 to communicate directly with each other, thereby eliminating the need for a central server.

According to the disclosed techniques, companion application 105 of primary device 100 and/or companion application 115 of vehicle head unit 102 may process and transmit data between primary device 100 and vehicle head unit 102 in one or a plurality of packets via transport 109.

In operation, companion application 105 of primary device 100 may receive, from an application 104 executing on primary device 100, an indication of data to be transferred between primary device 100 and vehicle head unit 102. Instead of directly transmitting the data from primary device 100 to vehicle head unit 102, companion application 105 of primary device 100 may determine an amount of data to be transferred between primary device 100 and vehicle head unit 102 based on the indication of the data.

Companion application 105 of primary device 100 may further determine whether the amount of data satisfies a maximum packet size for the wireless networking protocol of transport 109. For example, transport 109 may be a wireless transport operating in accordance with a wireless networking protocol having limited packet sizes, such as Bluetooth® communication protocol or Bluetooth® Low Energy communication protocol, and companion application 105 of primary device 100 may determine whether the amount of data to be transferred between primary device 100 and vehicle head unit 102 satisfies the limited packet size.

Responsive to determining that the amount of data does not satisfy the maximum packet size, companion application 105 of primary device 100 may segment the data into data segments and transmit a plurality of packets containing the data segments to companion application 115 of vehicle head unit 102 via transport 109. In some examples, companion application 105 of primary device 100 may append segmentation information to the data segments. The segmentation information may include a packet identifier, a total packet number, a data identifier, and so forth. In various instances, responsive to determining that the amount of data satisfies the maximum packet size, companion application 105 of primary device 100 may transmit a single packet to companion application 115 of vehicle head unit 102 via transport 109. The single packet may include the data.

Companion application 115 of vehicle head unit 102 may receive the plurality of packets from companion application 105 of primary device 100 via transport 109. Each of the plurality of packets includes a portion of the data that is configured in accordance with the wireless networking protocol of transport 109.

Responsive to receiving the plurality of packets from primary device 100, companion application 115 of vehicle head unit 102 may combine the portions of data included in each of the plurality of packets into the data. In some examples, companion application 115 of vehicle head unit 102 combines the portions of data included in each of the plurality of packets into the data based on a respective segment identifier included in each of the plurality of packets.

Companion application 115 of vehicle head unit 102 may further provide the data to an additional application 114 of vehicle head unit 102. For example, companion application 115 of vehicle head unit 102 may output the data to additional application 114 for GUI projection via display 116 of vehicle head unit 102.

As such, companion application 105 of primary device 100 and companion application 115 of vehicle head unit 102 may provide a peer to peer communication channel that enables primary device 100 and vehicle head unit 102 to transmit data directly with each other via transport 109. The peer to peer communication channel may be beneficial as it provides a decentralized environment that minimizes single point of failure and thereby potentially promotes vehicle network communication.

Furthermore, by segmenting data into data segments and transmitting the data in a plurality of packets, the disclosed techniques enhance the overall reliability and fault-tolerance of data communication. By restart transmitting only the undelivered packets, various aspects of the techniques may enable the primary device and the head unit to operate more efficiently (e.g., in terms of processor cycles expended, memory consumed, memory bus bandwidth utilized, wireless bandwidth consumed, etc.) as restart transmitting the entire data requires additional resources (e.g., processor cycles, memory space, memory bus bandwidth, wireless bandwidth, etc.).

While described with respect to primary device 100, vehicle head unit 102 may perform various aspects of the peer to peer communication techniques described in this disclosure. Furthermore, while described with respect to the GUI, various aspects of the techniques may facilitate projection of data in general, where such data may include data representative of voice communications (such as for a telephone application), data representative of video communications (such as for a videoconferencing application), data representative of music (such as a music streaming or playback application), data representative of navigation playback that may include one or more of voice notifications, GUI notifications, and a GUI, or various combinations thereof. In this way, various aspects of the techniques may enable general data projection by companion application 105 of primary device 100 working in conjunction with companion application 115 of vehicle head unit 102 to project data via transport 109 to vehicle head unit 102.

Figure 2:
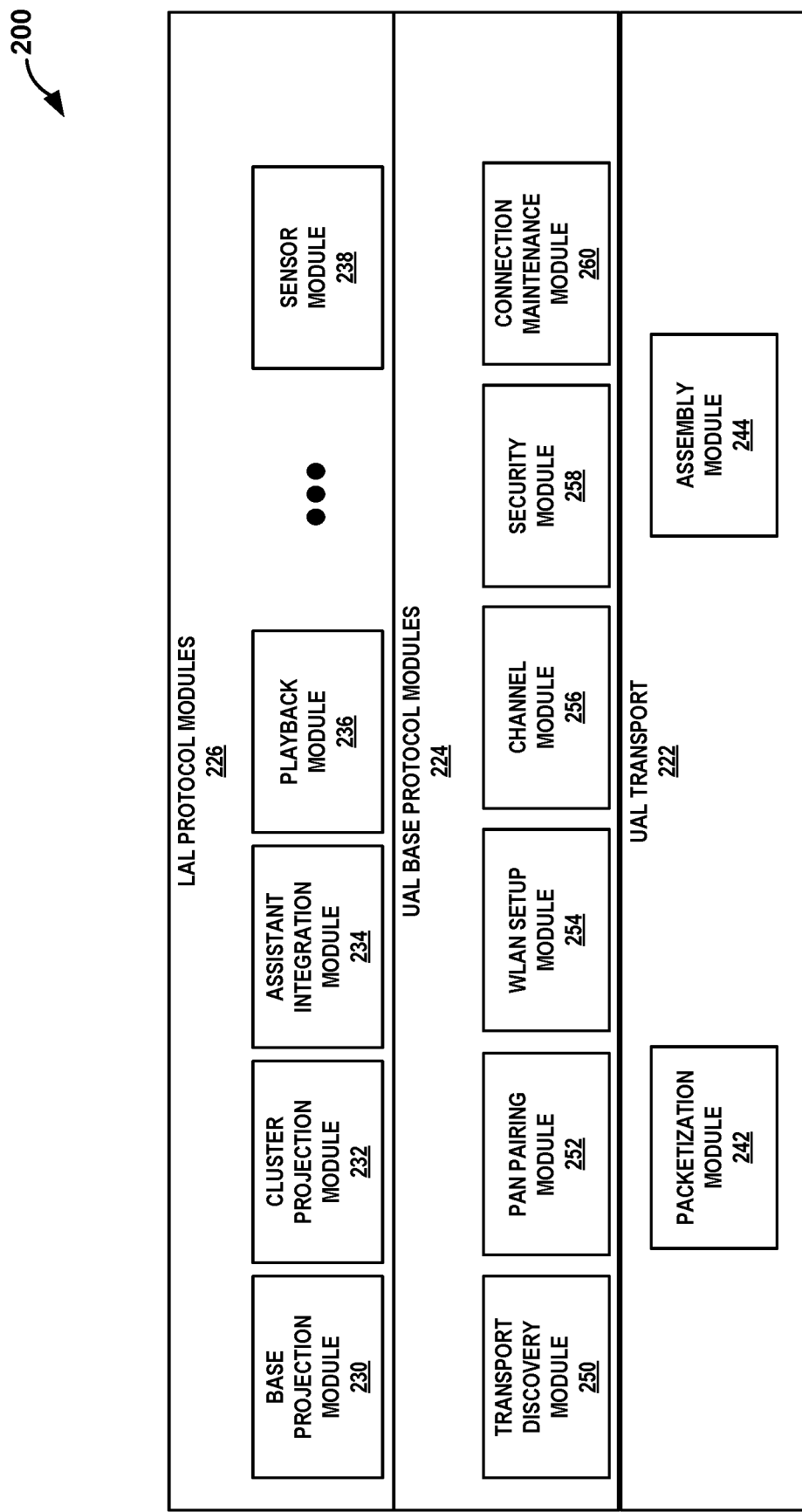
FIG. 2 is a block diagram illustrating a conceptual diagram of a hierarchical architecture of an operating system by which peer to peer communication may occur in accordance with various aspects of the techniques described in this disclosure.

FIG. 2 is a block diagram illustrating a conceptual diagram of a hierarchical architecture of an operating system by which peer to peer communication channel may occur in accordance with various aspects of the techniques described in this disclosure. Operating system 200 may represent an example of operating system 103 and/or operating system 113 that may configure one or more processors to, when executed, perform various aspects of the seamless transport management techniques described in this disclosure.

In the example of FIG. 2, operating system 200 may include a universal automotive link (UAL) transport 222, a UAL base protocol module 224, and a legacy automotive link (LAL) protocol module 226. UAL transport 222 may represent the underlying transport (e.g., one or more of a PAN transport, a WLAN transport, a wireless transport, such as a Bluetooth® transport, etc.) selected by operating system 200.

UAL base protocol modules 224 may represent services provided by operating system 200 in support of establishing and managing UAL transport 222. As shown in the example of FIG. 2, UAL base protocol modules 224 may include a transport discovery module 250, a PAN pairing module 252, a WLAN setup module 254, a channel module 256, a security module 258, and a connection maintenance module 260.

Transport discovery module 250 may represent a module configured to discover various transports available for connecting primary device 100 to vehicle head unit 102. Transport discovery module 250 may offload transport discovery from the application sourcing the data for projection (which is assumed to be application 104 in this example).

PAN pairing module 252 may represent a module configured to perform various operations for establishing a PAN transport, including the initial pairing of primary device 100 to vehicle head unit 102 to facilitate reconnections when in proximity to one another without requiring the pairing process. WLAN setup module 254 may represent a module configured to establish a WLAN transport between primary device 100 and vehicle head unit 102.

Channel module 256 may represent a module configured to establish a channel over the transport by which the data to be projected is provided. Security module 258 may represent a module configured to secure the channel/transport, e.g., by applying support secure socket layer (SSL) encryption or any of the other security mechanisms, such as secure-real-time transport protocol (SRTP) encryption, datagram transport layer security (DTLS) encryption, transport layer security (TLS) encryption, etc. Connection maintenance module 260 may represent a module configured to negotiate or otherwise monitor a Quality of Service (QoS) of UAL transport 222, a bandwidth of UAL transport 222, a latency of the UAL transport 222, a burstiness of UAL transport 222, and/or any other characteristic. Connection maintenance module 260 may also perform reconnects as a result of disruptions to UAL transport 222.

As further shown in the example of FIG. 2, LAL protocol modules 226 include a base projection module 230, a cluster projection module 232, an assistant integration module 234, a playback module 236, and a sensor module 238 (as well as other modules supported by LAL protocol modules 226 that are not shown in the example of FIG. 2 for ease of illustration purposes). Base projection module 230 represents a legacy projection module that requests a specific transport be configured prior to initiating projection via the requested transport. In some examples, base projection module 230 may include a Bluetooth® module. For example, base projection module 230 may receive a Bluetooth® pairing request from a Bluetooth® module of vehicle head unit 102, and pair base projection module 230 with the Bluetooth® module of vehicle head unit 102.

UAL base protocol modules 224 may, as noted above, translate this request into a general request for a transport and then configure UAL transport 222. After configuring UAL transport 222, UAL base protocol modules 224 may continue to translate requests for projecting data to accommodate UAL transport 222, possibly switching the underlying transport used for UAL transport 222 to project the data from application 104 to vehicle head unit 102.

UAL transport 222 may include a packetization module 242 and an assembly module 244. Packetization module 242 may represent a module configured to receive data in data segments from companion application 105 of primary device 100 and packet the received data segments into a plurality of packets based on segmentation information appended to the data segments. In some examples, segmentation information may include a packet identifier, a total packet number, a data identifier, and so forth. Assembly module 244 may represent a module configured to receive a plurality of packets from companion application 115 of vehicle head unit 102 and combine portions of data included in the plurality of packets into data based on segmentation information included in the plurality of packets. In some examples, assembly module 244 may combine the portions of data included in each of the plurality of packets based on a respective segment identifier included in each of the plurality of packets.

Cluster projection module 232 may represent a module configured to manage clustered projection from one or more primary devices, e.g., including primary device 100. Cluster projection module 232 may enable multiple primary devices to project to one or more displays, e.g., display 116, of vehicle head unit 102. In some instances, multiple primary devices may project to the same display, e.g., display 116, or to two or more different displays (which vehicle head unit 102 may include although not shown in the example of FIG. 1).

Assistant integration module 234 may represent a module configured to facilitate integration of a voice and/or text assistant during projection of data to vehicle head unit 102. A voice/text assistant may provide various assistant services during projection of data to vehicle head unit 102, allowing an occupant of the vehicle to interact with the assistant to request, as a few examples, navigation, text message composition, text message playback (in which the assistant reads aloud an incoming text message), music playback (including streaming music playback), video playback (including streaming video playback), and the like.

Playback module 236 may represent a module configured to perform music and/or video playback via projection of data representative of music and/or video to vehicle head unit 102. Playback module 236 may interface, via the projection mode, with an audio and/or video (AV) system of vehicle head unit 102 to perform playback of music and/or video. While described with respect to music, playback module 236 may perform any form of audio playback, including playback of assistant audio (e.g., reading aloud an incoming text message), navigation (e.g., audio associated with directions), and the like.

Sensor module 238 may represent a module configured to interface with sensors of vehicle head unit 102. Sensor module 238 may issue requests for sensor data from sensors coupled to vehicle head unit 102, including sensors such as a Global Positioning System (GPS) sensor, an ambient light sensor, a proximity sensor, an altimeter, a gyroscope, and any other sensor commonly found in vehicles.

Figure 3:
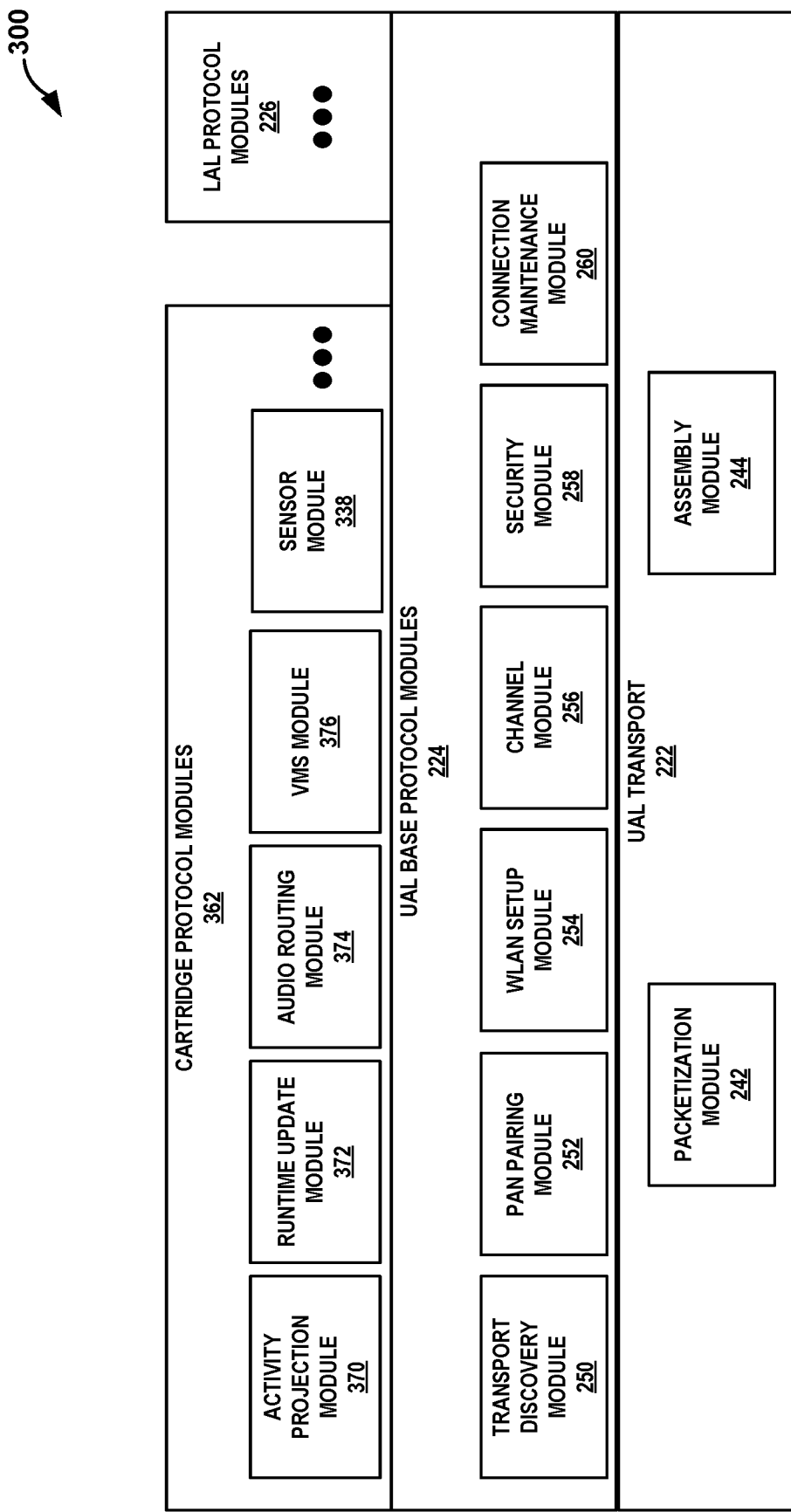
FIG. 3 is another block diagram illustrating a conceptual diagram of a hierarchical architecture of an operating system by which peer to peer communication may occur in accordance with various aspects of the techniques described in this disclosure.

FIG. 3 is another block diagram illustrating a conceptual diagram of a hierarchical architecture of an operating system by which peer to peer communication may occur in accordance with various aspects of the techniques described in this disclosure. Operating system 300 may represent an example of operating system 103 and/or operating system 113 that may configure one or more processors to, when executed, perform various aspects of the peer to peer communication techniques described in this disclosure.

In the example of FIG. 3, operating system 300 is similar to operating system 200 in that operating system 300 includes UAL transport 222, UAL base protocol modules 224, and LAL protocol modules 226. However, operating system 300 includes another suite of protocol module, denoted cartridge protocol modules 362, that support connectivity between a cartridge, primary device 100 and vehicle head unit 102. More information regarding the cartridge can be found in U.S. patent application Ser. No. 17/065,932, entitled "EXTENSIBLE COMPUTING ARCHITECTURE FOR VEHICLES," filed Oct. 8, 2020.

Briefly, the cartridge may couple to vehicle head unit 102 as an extension to vehicle head unit 102, allowing the owner of the vehicle to upgrade vehicle head unit 102 via installation of the cartridge to present an updated in-vehicle experience. The owner of the vehicle may install the cartridge, in other words, to upgrade physical hardware associated with vehicle head unit 102 and thereby provide an up-to-date user experience consistent with newer vehicle head units that does not require replacement of the entire vehicle head unit. Primary device 100 may couple to the cartridge (via a transport) and interact with the cartridge to project data from application 104, where the cartridge may act as an intermediate device to project the data from application 104 to vehicle head unit 102.

Cartridge protocol modules 362 may represent protocol modules configured to interface with the cartridge in order to perform the projection through the intermediate cartridge. Cartridge protocol modules 362 may include an activity projection module 370, a runtime update module 372, an audio routing module 374, a virtual machines (VMS) module 376, a sensor module 338, and additional modules similar to LAL protocol modules 226. Activity projection module 370 may represent a module configured to support pass-through projection of data received from application 104 executed by primary device 100.

Runtime update module 372 may represent a module configured to update shared resources (e.g., shared libraries) at runtime (or in other words at the time of execution) to allow for interconnectivity with primary device 100 and vehicle head unit 102. Audio routing module 374 represents a module configured to route audio data received via primary device 100 and vehicle head unit 102 between primary device 100 and vehicle head unit 102. VMS module 376 represents a module configured to execute virtual machines to provide various functionality associated with the cartridge described in the above referenced U.S. Patent Application. Sensor module 338 may represent a module similar to sensor module 338 except for the sensor module 338 may operate with respect to sensors present on the cartridge.

Figure 4:
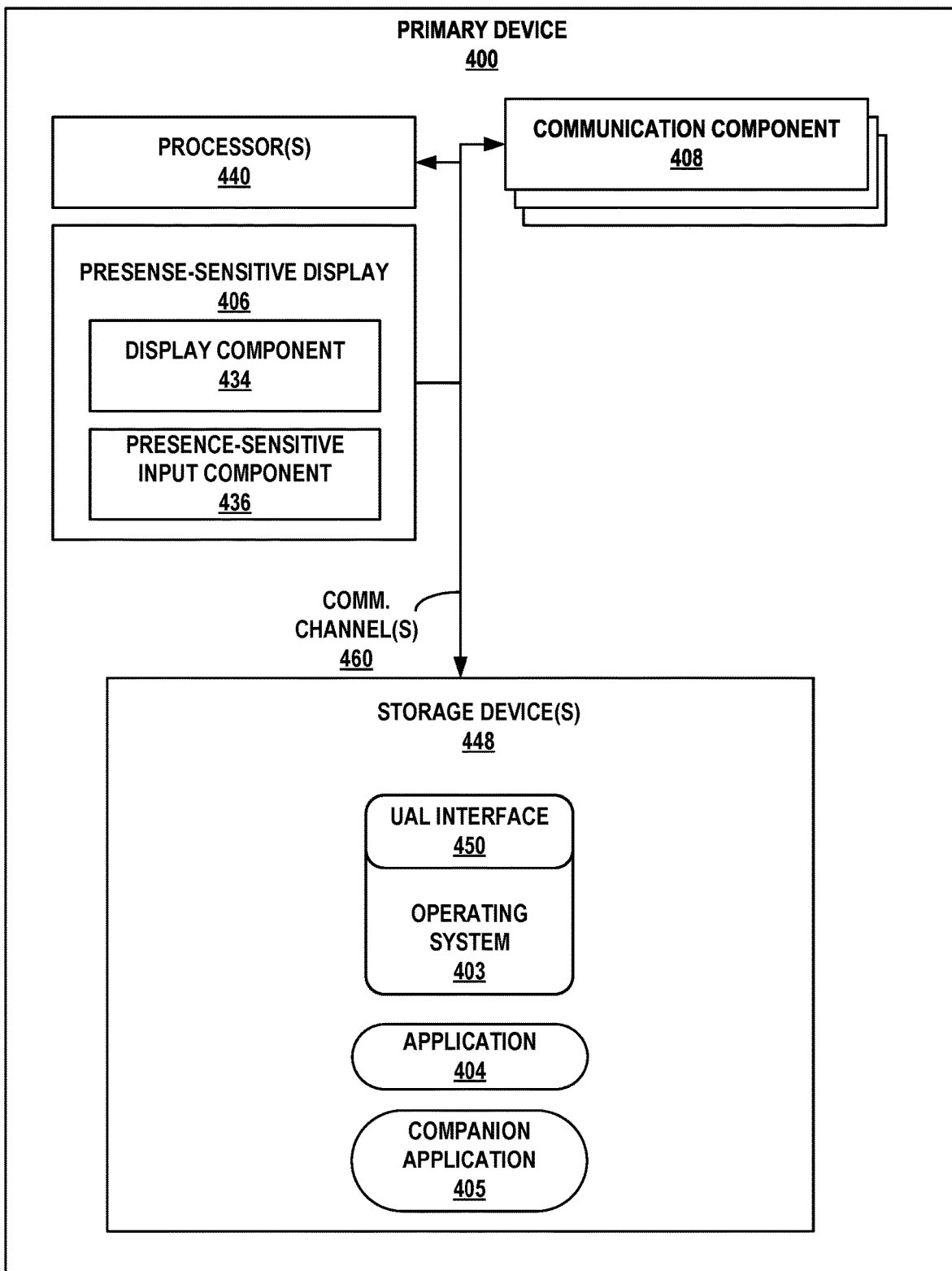
FIG. 4 is a block diagram illustrating, in greater detail, the primary device of FIG. 1.

FIG. 4 is a block diagram illustrating an example of the primary device of FIG. 1 in more detail. Primary device 400 shown in the example of FIG. 4 is one example of primary device 100 shown in FIG. 1. As shown in the example of FIG. 4, primary device 400 includes presence-sensitive display 406, one or more processors 440, one or more communication components 408, and one or more storage devices 448. Storage devices 448 of primary device 400 include an operating system 403 (which may be an example of operating system 103 shown in the example of FIG. 1) that presents a single UAL interface 450 by which to initiate, update, and otherwise maintain and/or manage a transport between primary device 400 and vehicle head unit 102.

Communication channels 460 may interconnect each of the components 406, 408, 440, and/or 448 for inter-component communications (physically, communicatively, and/or operatively) and thereby allow components 406, 408, 440, and 448 to communicate with one another. In some examples, communication channels 460 may include a system bus, a network connection, one or more inter-process communication data structures, or any other components for communicating data (also referred to as information). Although shown as including components 406, 408, 440, 460, and 448, primary device 400 may include other components or less components than those shown, where such components may be included in other control units such as a telematic control unit (TCU).

One or more communication components 408 of primary device 400 may communicate with external devices by transmitting and/or receiving data. For example, primary device 400 may use one or more of communication components 408 to transmit and/or receive radio signals on a radio network such as a cellular radio network. In some examples, communication components 408 may transmit and/or receive satellite signals on a satellite network such as a GPS network. Examples of communication components 408 include a network interface card (e.g., such as an Ethernet card), an optical transceiver, a radio frequency transceiver, a GPS receiver, or any other type of device that can send and/or receive information. Other examples of communication components 408 may include short wave radios (e.g., NFC, Bluetooth® (including Bluetooth® Low Energy)), GPS, 3G, 4G, 5G, and Wi-Fi™ radios found in mobile devices as well as Universal Serial Bus (USB) controllers and the like. For instance, communication components 408 may include a Bluetooth® communication module and primary device 400 may receive a Bluetooth® pairing request from a Bluetooth® communication module of an external device (e.g., communication component 118A of vehicle head unit 102 as shown in FIG. 1), and pair one of communication components 408 of primary device 400 with the Bluetooth® module of the external device.

In some examples, presence-sensitive display 406 of primary device 400 may include functionality of an input component and/or an output component. In the example of FIG. 4, presence-sensitive display 406 may include a presence-sensitive input (PSI) component 436 ("PSI component 436"), such as a presence-sensitive screen or touch-sensitive screen. In some examples, presence-sensitive input component 436 may detect an object at and/or near the presence-sensitive input component. As one example range, presence-sensitive input component 436 may detect an object, such as a finger or stylus that is within two inches or less of presence-sensitive input component 436. Presence-sensitive input component 436 may determine a location (e.g., an (x, y) coordinate) of the presence-sensitive input component at which the object was detected. In another example range, presence-sensitive input component 436 may detect an object two inches or less from presence-sensitive input component 436 and other ranges are also possible. Presence-sensitive input component 436 may determine the location of presence-sensitive input component 436 selected by a user's finger using capacitive, inductive, and/or optical recognition techniques.

In some examples, presence-sensitive display 406 may also provide output to a user using tactile, audio, or video stimuli. For instance, presence-sensitive display 406 may include display component 434 that displays a graphical user interface. Display component 434 may be any type of output component that provides visual output. While illustrated as an integrated component of primary device 400, presence-sensitive display 406 may, in some examples, be an external component that shares a data or information path with other components of primary device 400 for transmitting and/or receiving input and output. For instance, presence-sensitive display 406 may be a built-in component of primary device 400 located within and physically connected to the external packaging of primary device 400 (e.g., an in-vehicle screen mounted in a dashboard of a vehicle). In another example, presence-sensitive display 406 may be an external component of primary device 400 located outside and physically separated from the packaging of primary device 400 (e.g., a monitor, a projector, etc. that shares a wired and/or wireless data path with an electronic control unit of the vehicle). In some examples, presence-sensitive display 406, when located outside of and physically separated from the packaging of primary device 400, may be implemented by two separate components: a presence-sensitive input component 436 for receiving input and a display component 434 for providing output.

One or more storage devices 448 within primary device 400 may store information for processing during operation of primary device 400 (e.g., primary device 400 may store data accessed by operating system 403 during execution at primary device 400). In some examples, storage device 448 is a temporary memory, meaning that the primary purpose of storage device 448 is not long-term storage. Storage devices 448 on primary device 400 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 448, in some examples, also include one or more computer-readable storage media. Storage devices 448 in some examples include one or more non-transitory computer-readable storage mediums. Storage devices 448 may be configured to store larger amounts of information than typically stored by volatile memory. Storage devices 448 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 448 may store program instructions and/or information (e.g., data) associated with operating system 403, application 404 (which may be similar if not substantially similar to application 104), and companion application 405 (which may be similar if not substantially similar to companion application 105). Storage devices 448 may include a memory configured to store data or other information associated with operating system 403, application 404, and companion application 405.

One or more processors 440 may implement functionality and/or execute instructions associated with primary device 400. Examples of processors 440 include application processors, display controllers, auxiliary processors, one or more sensor hubs, and any other hardware configure to function as a processor, a processing unit, or a processing device. Operating system 403, application 404, and companion application 405 may be operable (or, in other words, executed) by processors 440 to perform various actions, operations, or functions of primary device 400. That is, modules 403-405 may form executable bytecode, which when executed, cause processors 440 to perform specific operations in accordance with (and thereby causing primary device 400 to become a specific-purpose computer by which to perform) various aspects of the techniques described herein. For example, processors 440 of primary device 400 may retrieve and execute instructions stored by storage devices 448 that cause processors 440 to perform the operations described herein that are attributed to operating system 403, application 404, and companion application 405. The instructions, when executed by processors 440, may cause primary device 400 to store information within storage devices 448.

As further shown in the example of FIG. 4, operating system 403 includes a UAL interface 450, which is another way of referring to the portion of the operating system denoted as operating system 200 (in the example of FIG. 2) and operating system 300 (in the example of FIG. 3). As such, UAL interface 450 may present a single communication interface by which to request a transport.

In some examples, companion application 405 of primary device 400 may receive an indication of data to be transferred between primary device 400 and an external device (e.g., vehicle head unit 102) from application 404. Instead of directly transmitting the data from primary device 400 to the external device, companion application 405 of primary device 400 may determine an amount of data to be transferred based on the indication of the data. Companion application 405 of primary device 400 may further determine whether the amount of data satisfies a maximum packet size for the wireless networking protocol of the UAL transport provided by UAL interface 450. For example, the transport may be a wireless transport operating in accordance with a wireless networking protocol having limited packet sizes, such as Bluetooth® communication protocol or Bluetooth® Low Energy communication protocol, and companion application 405 of primary device 400 may determine whether the amount of data to be transferred satisfies the limited packet size. Responsive to determining that the amount of data does not satisfy the maximum packet size, companion application 405 may segment the data into data segments and transmit a plurality of packets containing the data segments to the external device via the UAL transport. Responsive to determining that the amount of data satisfies the maximum packet size, companion application 405 may transmit a single packet containing the data to the external device via the UAL transport.

Operating system 403 may monitor the underlying UAL transport provided by way of UAL interface 450 and identify when the UAL transport has experienced a connection failure. For instance, operating system 403 may identify the UAL transport has experienced a connection failure during an operation to transmit data in a plurality of packets from primary device 400 to an external device (e.g., vehicle head unit 102 of FIG. 1).

Responsive to determining that the UAL transport has experienced a connection failure, UAL interface 450 may reestablish the underlying UAL transport to restart transmitting only undelivered packets to the external device (e.g., vehicle head unit 102 of FIG. 1) via the UAL transport. By restart transmitting only the undelivered packets, various aspects of the techniques may enable primary device 400 to operate more efficiently (e.g., in terms of processor cycles expended, memory consumed, memory bus bandwidth utilized, wireless bandwidth consumed, etc.) as restart transmitting the entire data requires additional resources (e.g., processor cycles, memory space, memory bus bandwidth, wireless bandwidth, etc.).

Figure 5:
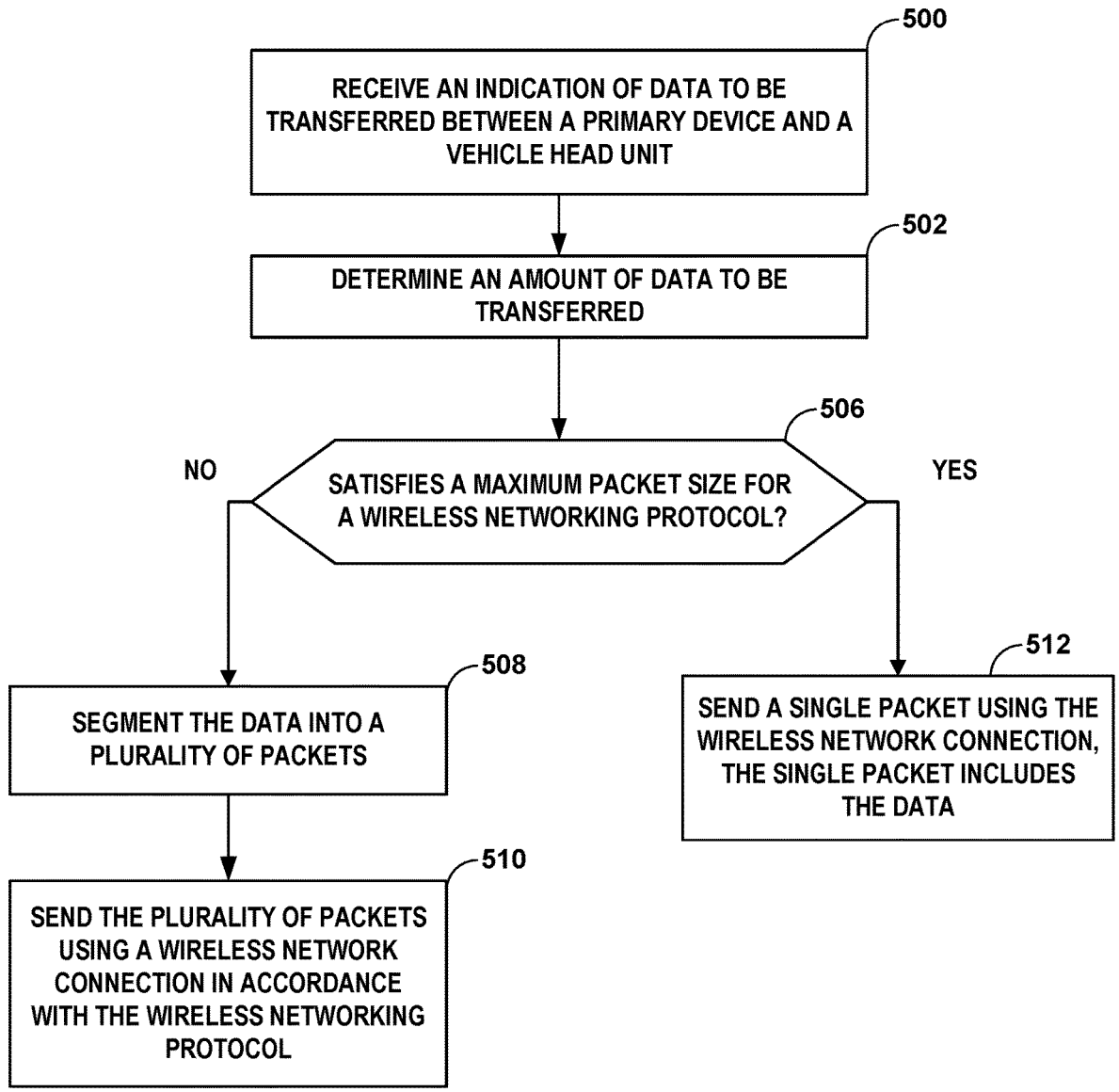
FIG. 5 is a flowchart illustrating exemplary operation of the primary device of FIG. 1 in segmenting data and transmitting data in packets via a peer to peer communication channel in accordance with techniques of this disclosure.

FIG. 5 is a flowchart illustrating exemplary operation of the primary device of FIG. 1 in segmenting data and transmitting data in packets via a peer to peer communication channel in accordance with techniques of this disclosure. In the example of FIG. 5, primary device 100 may execute operating system 103 to present a single communication interface (e.g., UAL interface 450 shown in the example of FIG. 4) by which companion application 105 may establish transport 109 (500) between primary device 100 and vehicle head unit 102 that facilitates data transmission (e.g., transmission of music audio data via a PAN transport 109, transmission of a GUI data via a wireless or wired transport 109, etc.) for presentation by vehicle head unit 102.

Companion application 105 executing on primary device 100 may receive, from application 104 executing on primary device 100, an indication of data to be transferred between primary device 100 and vehicle head unit 102 via transport 109 (502). In some examples, transport 109 may be a wireless transport operating in accordance with a wireless networking protocol having limited packet sizes, such as Bluetooth® protocol.

Companion application 105 of primary device 100 may determine an amount of data to be transferred between primary device 100 and vehicle head unit 102 based on the indication of the data (504). Companion application 105 of primary device 100 may further determine whether the amount of data satisfies a maximum packet size for the wireless networking protocol of transport 109 (506).

Responsive to determining that the amount of data does not satisfy the maximum packet size ("NO" branch of 506), companion application 105 of primary device 100 may segment and pack the data into a plurality of packets (508). Each packet from the plurality of packets may include an amount of data that satisfies the maximum packet size. Companion application 105 of primary device 100 may further transmit the plurality of packets to companion application 115 of vehicle head unit 102 via transport 109 (510). However, if the amount of data satisfies the maximum packet size ("YES" branch of 506), companion application 105 of primary device 100 may send a single packet including the data to companion application 115 of vehicle head unit 102 via transport 109 (512).

Figure 6:
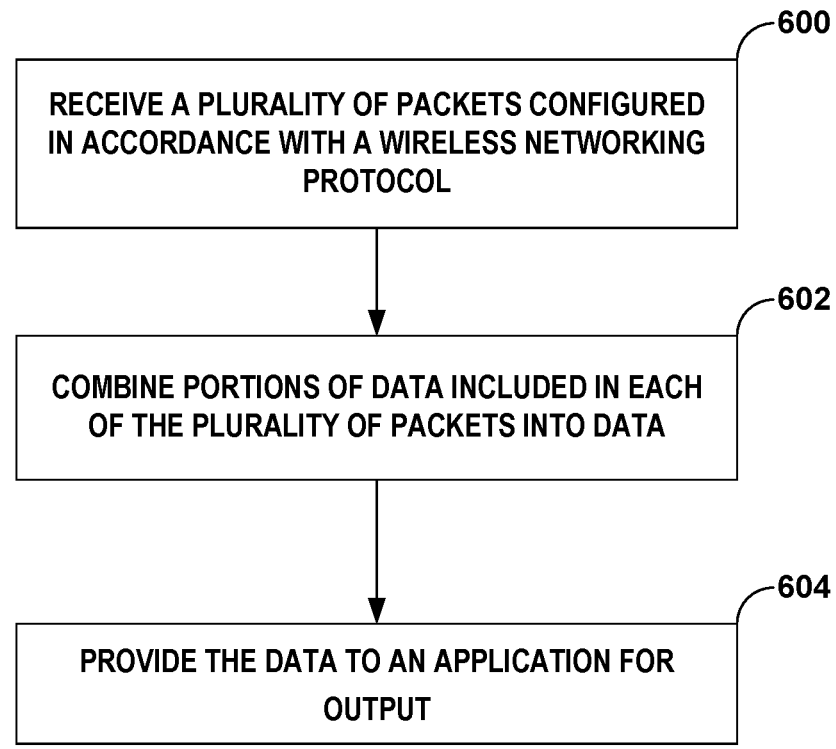
FIG. 6 is a flowchart illustrating exemplary operation of the primary device of FIG. 1 in receiving packets via a peer to peer communication channel and assembling data segments included in the packets in accordance with techniques of this disclosure.

FIG. 6 is a flowchart illustrating exemplary operation of the primary device of FIG. 1 in receiving packets via a peer to peer communication channel and assembling data segments included in the packets in accordance with techniques of this disclosure. In the example of FIG. 6, primary device 100 may execute operating system 103 to present a single communication interface (e.g., UAL interface 450 shown in the example of FIG. 4) by which companion application 105 may establish transport 109 (600) between primary device 100 and vehicle head unit 102 that facilitates data transmission (e.g., transmission of music audio data via a PAN transport 109, transmission of a GUI data via a wireless or wired transport 109, etc.).

Companion application 105 executing on primary device 100 may receive, from vehicle head unit 102, a plurality of packets configured in accordance with the wireless networking protocol of transport 109 (602). Each of the plurality of packets include a portion of data provided by application 114 executing on vehicle head unit 102, and the data is segmented and packed into the plurality of packets by companion application 115 executing on vehicle head unit 102. Additionally, in this example, the size of the data is larger than the maximum packet size for the wireless networking protocol of transport 109.

Companion application 105, responsive to receiving the plurality of packets via transport 109, may combine the portions of data included in each of the plurality of packets into the data (602). In some examples, the portions of data included in each of the plurality of packets may be combined based on a respective segment identifier included in each of the plurality of packets. Companion application 105 may further provide the assembled data to application 104 of primary device 100 for output (e.g., via presence-sensitive display 406 of primary device 400) (604).

In this way, various aspects of the techniques may enable the following clauses.

Clause 1. A method comprising: receiving, by a first application executing on a primary device and from a second application executing on the primary device, an indication of data to be transferred between the primary device and a vehicle head unit, wherein the primary device and the vehicle head unit are communicatively coupled via a wireless network connection operating in accordance with a wireless networking protocol; determining, by the first application and based on the indication of the data, an amount of data to be transferred from the primary device to the vehicle head unit; determining, by the first application, whether the amount of data satisfies a maximum packet size for the wireless networking protocol; responsive to determining that the amount of data does not satisfy the maximum packet size: segmenting, by the first application, the data into a plurality of packets, wherein each packet from the plurality of packets includes an amount of data that satisfies the maximum packet size; and sending, from the primary device and to the vehicle head unit, the plurality of packets using the wireless network connection; and responsive to determining that the amount of data satisfies the maximum packet size, sending, from the primary device and to the vehicle head unit, a single packet using the wireless network connection, wherein the single packet includes the data.

Clause 2. The method according to Clause 1, wherein the wireless networking protocol comprises a BLUETOOTH communication protocol or a BLUETOOTH Low Energy communication protocol.

Clause 3. The method according to any of Clauses 1 or 2, further comprising: receiving a BLUETOOTH pairing request from a BLUETOOTH module of the vehicle head unit, and pairing a BLUETOOTH module of the primary device with the BLUETOOTH module of the vehicle head unit.

Clause 4. The method according to any of Clauses 1 through 3, wherein segmenting, by the first application, the data into a plurality of packets comprises: for each packet of the plurality of packets, appending respective segmentation information, wherein the respective segmentation information comprises a packet identifier, a total packet number, and a data identifier.

Clause 5. The method according to Clause 4, further comprising: sending, from the first application executing on the primary device and to the vehicle head unit, the plurality of packets.

Clause 6. The method according to any of Clauses 1 through 5, further comprising: receiving, by the first application executing on the primary device, from the vehicle head unit, and using the wireless network connection, a second plurality of packets, wherein the second plurality of packets are configured in accordance with the wireless networking protocol, wherein each of the second plurality of packets include a portion of second data provided by a second application executing on the vehicle head unit, wherein the second data is segmented into the second plurality of packets by a first application executing on the vehicle head unit, and wherein a size of the second data is larger than the maximum packet size for the wireless networking protocol; combining, by the first application executing on the primary device, the portions of second data included in each of the second plurality of packets into the second data; and providing, by the first application executing on the primary device and to the second application executing on the primary device, the second data, wherein the first and second applications executing on the primary device are different from an operating system executing on the primary device, and wherein the first and second applications executing on the vehicle head unit are different from an operating system executing on the vehicle head unit.

Clause 7. A method comprising: receiving, by a first application executing on a vehicle head unit, from a primary device, and using a wireless network connection, a plurality of packets, wherein the packets are configured in accordance with a wireless networking protocol, wherein each of the packets include a portion of data provided by a first application executing on the primary device, wherein the data is segmented into the plurality of packets by a second application executing on the primary device, and wherein the data has a size that is larger than a maximum packet size for the wireless networking protocol; combining, by the first application executing on the vehicle head unit, the portions of data included in each of the packets into the data; and providing, by the first application executing on the vehicle head unit and to a second application executing on the vehicle head unit, the data, wherein the first and second applications executing on the vehicle head unit are different from an operating system executing on the vehicle head unit, and wherein the first and second applications executing on the primary device are different from an operating system executing on the primary device.

Clause 8. The method according to Clause 7, wherein the wireless networking protocol comprises a BLUETOOTH communication protocol or a BLUETOOTH Low Energy communication protocol.

Clause 9. The method according to any of Clauses 7 or 8, further comprising: receiving a BLUETOOTH pairing request from a BLUETOOTH module of the primary device, and pairing a BLUETOOTH module of the vehicle head unit with the BLUETOOTH module of the primary device.

Clause 10. The method according to any of Clauses 7 through 9, wherein combining the portions of data included in each of the packets into the data is based on a respective segment identifier included in each of the plurality of packets.

Clause 11. The method according to any of Clauses 7 through 10, further comprising: receiving, by the first application executing on the vehicle head unit and from the second application executing on the vehicle head unit, an indication of second data to be transferred between the vehicle head unit and the primary device; determining, by the first application executing on the vehicle head unit and based on the indication of the second data, an amount of second data to be transferred from the vehicle head unit to the primary device; determining, by the first application executing on the vehicle head unit, whether the amount of second data satisfies the maximum packet size for the wireless networking protocol; responsive to determining that the amount of second data does not satisfy the maximum packet size: segmenting, by the first application executing on the vehicle head unit, the second data into a second plurality of packets, wherein each packet of the second plurality of packets includes an amount of second data that satisfies the maximum packet size; and sending, from the vehicle head unit and to the primary device, the second plurality of packets using the wireless network connection; and responsive to determining that the amount of second data satisfies the maximum packet size, sending, from the vehicle head unit and to primary device, a single packet using the wireless network connection, wherein the single packet includes the second data.

Clause 12. A primary device comprising: a memory configured to store an operating system, a first application, and a second application; and one or more processors configured to: receive, by the first application executing on the primary device and from the second application executing on the primary device, an indication of data to be transferred between the primary device and a vehicle head unit, wherein the primary device and the vehicle head unit are communicatively coupled via a wireless network connection operating in accordance with a wireless networking protocol; determine, by the first application and based on the indication of the data, an amount of data to be transferred from the primary device to the vehicle head unit; determine, by the first application, whether the amount of data satisfies a maximum packet size for the wireless networking protocol; responsive to determining that the amount of data does not satisfy the maximum packet size: segment, by the first application, the data into a plurality of packets, wherein each packet from the plurality of packets includes an amount of data that satisfies the maximum packet size; and send, from the primary device and to the vehicle head unit, the plurality of packets using the wireless network connection; and responsive to determining that the amount of data satisfies the maximum packet size, send, from the primary device and to the vehicle head unit, a single packet using the wireless network connection, wherein the single packet includes the data.

Clause 13. The device according to Clause 12, wherein the wireless networking protocol comprises a BLUETOOTH communication protocol or a BLUETOOTH Low Energy communication protocol.

Clause 14. The device according to any of Clauses 12 or 13, wherein the one or more processors further configured to: receive a BLUETOOTH pairing request from a BLUETOOTH module of the vehicle head unit, and pair a BLUETOOTH module of the primary device with the BLUETOOTH module of the vehicle head unit.

Clause 15. The device according to any of Clauses 12 through 14, wherein the one or more processors further configured to: for each packet of the plurality of packets, append respective segmentation information, wherein the respective segmentation information comprises a packet identifier, a total packet number, and a data identifier.

Clause 16. The device according to Clause 15, wherein the one or more processors further configured to: send, from the first application executing on the primary device and to the vehicle head unit, the plurality of packets.

Clause 17. The device of any of Clauses 12 through 16, wherein the one or more processors further configured to: receive, by the first application executing on the primary device, from the vehicle head unit, and using the wireless network connection, a second plurality of packets, wherein the second plurality of packets are configured in accordance with the wireless networking protocol, wherein each of the second plurality of packets include a portion of second data provided by a second application executing on the vehicle head unit, wherein the second data is segmented into the second plurality of packets by a first application executing on the vehicle head unit, and wherein a size of the second data is larger than the maximum packet size for the wireless networking protocol; combine, by the first application executing on the primary device, the portions of second data included in each of the second plurality of packets into the second data; and provide, by the first application executing on the primary device and to the second application executing on the primary device, the second data, wherein the first and second applications executing on the primary device are different from an operating system executing on the primary device, and wherein the first and second applications executing on the vehicle head unit are different from an operating system executing on the vehicle head unit.

Clause 18. A vehicle head unit comprising: a memory configured to store an operating system, a first application, and a second application; and one or more processors configured to: receive, by the first application executing on the vehicle head unit, from a primary device, and via a wireless network connection, a plurality of packets, wherein the packets are configured in accordance with a wireless networking protocol, wherein each of the packets include a portion of data provided by a first application executing on the primary device, wherein the data is segmented into the plurality of packets by a second application executing on the primary device, and wherein the data has a size that is larger than a maximum packet size for the wireless networking protocol; combine, by the first application executing on the vehicle head unit, the portions of data included in each of the packets into the data; and provide, by the first application executing on the vehicle head unit and to a second application executing on the vehicle head unit, the data, wherein the first and second applications executing on the vehicle head unit are different from an operating system executing on the vehicle head unit, and wherein the first and second applications executing on the primary device are different from an operating system executing on the primary device.

Clause 19. The vehicle head unit of Clause 18, wherein the wireless networking protocol comprises a BLUETOOTH communication protocol or a BLUETOOTH Low Energy communication protocol.

Clause 20. The vehicle head unit of any of Clauses 18 or 19, further comprising:
receive a BLUETOOTH pairing request from a BLUETOOTH module of the primary device, and pair a BLUETOOTH module of the vehicle head unit with the BLUETOOTH module of the primary device.

Clause 21. The vehicle head unit of any of Clauses 18 through 20, wherein the one or more processors further configured to: combine the portions of data included in each of the packets into the data based on a respective segment identifier included in each of the plurality of packets.

Clause 22. The vehicle head unit of any of Clauses 18 through 21, wherein the one or more processors further configured to: receive, by the first application executing on the vehicle head unit and from the second application executing on the vehicle head unit, an indication of second data to be transferred between the vehicle head unit and the primary device; determine, by the first application executing on the vehicle head unit and based on the indication of the second data, an amount of second data to be transferred from the vehicle head unit to the primary device; determine, by the first application executing on the vehicle head unit, whether the amount of second data satisfies the maximum packet size for the wireless networking protocol; responsive to determining that the amount of second data does not satisfy the maximum packet size: segment, by the first application executing on the vehicle head unit, the second data into a second plurality of packets, wherein each packet of the second plurality of packets includes an amount of second data that satisfies the maximum packet size; and send, from the vehicle head unit and to the primary device, the second plurality of packets using the wireless network connection; and responsive to determining that the amount of second data satisfies the maximum packet size, send, from the vehicle head unit and to primary device, a single packet using the wireless network connection, wherein the single packet includes the second data.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a first application executing on a primary device and from a second application executing on the primary device, an indication of data to be transferred between the primary device and a vehicle head unit, wherein the primary device and the vehicle head unit are communicatively coupled via a network connection operating in accordance with a networking protocol;
determining, by the first application and based on the indication of the data, whether an amount of data to be transferred from the primary device to the vehicle head unit satisfies a maximum packet size for the networking protocol; and
responsive to determining that the amount of data does not satisfy the maximum packet size:
segmenting, by the first application, the data into a plurality of packets, wherein each packet from the plurality of packets includes an amount of data that satisfies the maximum packet size; and
sending, from the primary device and to the vehicle head unit, the plurality of packets using the network connection;
receiving, by the first application executing on the primary device, from the vehicle head unit, and using the network connection, a second plurality of packets, wherein each of the second plurality of packets includes a portion of second data provided by a second application executing on the vehicle head unit, wherein the second data is segmented into the second plurality of packets by a first application executing on the vehicle head unit, and wherein a size of the second data is larger than the maximum packet size for the networking protocol;
combining, by the first application executing on the primary device, the portion of second data included in each of the second plurality of packets into the second data; and
providing, by the first application executing on the primary device and to the second application executing on the primary device, the second data, wherein the first and second applications executing on the primary device are different from an operating system executing on the primary device, and wherein the first and second applications executing on the vehicle head unit are different from an operating system executing on the vehicle head unit.

2. The method of claim 1, wherein segmenting, by the first application, the data into a plurality of packets comprises:
for each packet of the plurality of packets, appending respective segmentation information, wherein the respective segmentation information includes a packet identifier, a total packet number, and a data identifier.

3. The method of claim 1, further comprising:
combining, by the first application executing on the primary device and based on a respective segment identifier included in each of the second plurality of packets, the portion of second data included in each of the second plurality of packets.

4. The method of claim 1,
wherein the first application executing on the vehicle head unit is executing on a cartridge device coupled to the vehicle head unit as an extension of the vehicle head unit, and
wherein the second application executing on the vehicle head unit is executing on the cartridge device.

5. The method of claim 1, wherein the networking protocol comprises a BLUETOOTH communication protocol or a BLUETOOTH Low Energy communication protocol.

6. The method of claim 1, further comprising:
executing, by the primary device, an operating system that includes a universal automotive link interface, wherein the universal automotive link interface provides one or more universal automotive link transports each associated with a respective wireless networking protocol; and
after sending a portion of the plurality of packets to the vehicle head unit using a first universal automotive link transport from the one or more universal automotive link transports and responsive to determining, by the primary device, that the first universal automotive link transport had a connection failure:
reestablishing, by the operating system, the first universal automotive link transport; and
sending, by the primary device and to the vehicle head unit using the first universal automotive link transport, a remaining portion of the plurality of packets that were not delivered to the vehicle head unit.

7. A primary device comprising:
a memory configured to store a first application, and a second application; and
one or more processors configured to execute the first application to:
receive, from the second application, an indication of data to be transferred between the primary device and a vehicle head unit, wherein the primary device and the vehicle head unit are communicatively coupled via a network connection operating in accordance with a networking protocol;
determine, based on the indication of the data, whether an amount of data to be transferred from the primary device to the vehicle head unit satisfies a maximum packet size for the networking protocol; and
responsive to determining that the amount of data does not satisfy the maximum packet size:
segment the data into a plurality of packets, wherein each packet from the plurality of packets includes an amount of data that satisfies the maximum packet size; and
send, to the vehicle head unit, the plurality of packets using the network connection;
receive, from the vehicle head unit and using the network connection, a second plurality of packets, wherein each of the second plurality of packets includes a portion of second data provided by a second application executing on the vehicle head unit, wherein the second data is segmented into the second plurality of packets by a first application executing on the vehicle head unit, and wherein a size of the second data is larger than the maximum packet size for the networking protocol;
combine the portion of second data included in each of the second plurality of packets into the second data; and
provide, to the second application executing on the primary device, the second data, wherein the first and second applications executing on the primary device are different from an operating system executing on the primary device, and wherein the first and second applications executing on the vehicle head unit are different from an operating system executing on the vehicle head unit.

8. The primary device of claim 7, wherein the one or more processors execute the first application to segment the data into a plurality of packets by at least executing the first application to, for each packet of the plurality of packets, append respective segmentation information, wherein the respective segmentation information includes a packet identifier, a total packet number, and a data identifier.

9. The primary device of claim 7, wherein the one or more processors further execute the first application to combine the portion of second data included in each of the second plurality of packets based on a respective segment identifier included in each of the second plurality of packets.

10. The primary device of claim 7, wherein the networking protocol comprises a BLUETOOTH communication protocol or a BLUETOOTH Low Energy communication protocol.

11. The primary device of claim 7,
wherein the first application executing on the vehicle head unit is executing on a cartridge device coupled to the vehicle head unit as an extension of the vehicle head unit, and
wherein the second application executing on the vehicle head unit is executing on the cartridge device.

12. The primary device of claim 7, wherein the one or more processors are further configured to:
execute an operating system that includes a universal automotive link interface, wherein the universal automotive link interface provides one or more universal automotive link transports each associated with a respective wireless networking protocol; and
after sending a portion of the plurality of packets to the vehicle head unit using a first universal automotive link transport from the one or more universal automotive link transports and responsive to determine that the first universal automotive link transport had a connection failure:
execute the operating system to reestablish the first universal automotive link transport; and
send, to the vehicle head unit using the first universal automotive link transport, a remaining portion of the plurality of packets that were not delivered to the vehicle head unit.

13. A non-transitory computer readable storage medium encoded with instructions for a first application that, when executed by one or more processors of a primary device, cause the one or more processors to:

receive an indication of data, from a second application, to be transferred between the primary device and a vehicle head unit, wherein the primary device and the vehicle head unit are communicatively coupled via a network connection operating in accordance with a networking protocol;

determine, based on the indication of the data, whether an amount of data to be transferred from the primary device to the vehicle head unit satisfies a maximum packet size for the networking protocol; and responsive to determining that the amount of data does not satisfy the maximum packet size:
  segment the data into a plurality of packets, wherein each packet from the plurality of packets includes an amount of data that satisfies the maximum packet size; and
  send, to the vehicle head unit, the plurality of packets using the network connection;

receive, from the vehicle head unit and using the network connection, a second plurality of packets, wherein each of the second plurality of packets includes a portion of second data provided by a second application executing on the vehicle head unit, wherein the second data is segmented into the second plurality of packets by a first application executing on the vehicle head unit, and wherein a size of the second data is larger than the maximum packet size for the networking protocol;

combine the portion of second data included in each of the second plurality of packets into the second data; and provide, to the second application executing on the primary device, the second data, wherein the first and second applications executing on the primary device are different from an operating system executing on the primary device, and wherein the first and second applications executing on the vehicle head unit are different from an operating system executing on the vehicle head unit.

14. The non-transitory computer readable storage medium of claim 13, wherein the one or more processors execute the first application to segment the data into a plurality of packets by at least executing the first application to, for each packet of the plurality of packets, append respective segmentation information, wherein the respective segmentation information includes a packet identifier, a total packet number, and a data identifier.

15. The non-transitory computer readable storage medium of claim 13, wherein the one or more processors further execute the first application to:
  combine the portion of second data included in each of the second plurality of packets based on a respective segment identifier included in each of the second plurality of packets.

16. The non-transitory computer readable storage medium of claim 13, wherein the networking protocol comprises a BLUETOOTH communication protocol or a BLUETOOTH Low Energy communication protocol.

17. The non-transitory computer readable storage medium of claim 13,
  wherein the instructions further include instructions for an operating system, the operating system including a universal automotive link interface that provides one or more universal automotive link transports each associated with a respective wireless networking protocol, and
  wherein the one or more processors execute the operating system to:
    after sending a portion of the plurality of packets to the vehicle head unit using a first universal automotive link transport from the one or more universal automotive link transports and responsive to determine that the first universal automotive link transport had a connection failure:
      reestablish the first universal automotive link transport; and
      send, to the vehicle head unit using the first universal automotive link transport, a remaining portion of the plurality of packets that were not delivered to the vehicle head unit.

18. The non-transitory computer readable storage medium of claim 13,
  wherein the first application executing on the vehicle head unit is executing on a cartridge device coupled to the vehicle head unit as an extension of the vehicle head unit, and
  wherein the second application executing on the vehicle head unit is executing on the cartridge device.

* * * * *